United States Patent [19]

Nishimoto et al.

[11] Patent Number: 5,244,202
[45] Date of Patent: Sep. 14, 1993

[54] SHEET FEEDING APPARATUS

[75] Inventors: Yoshifumi Nishimoto; Kenichi Kataoka, both of Yokohama, Japan

[73] Assignee: Canon Kabushiki Kaisha, Tokyo, Japan

[21] Appl. No.: 811,911

[22] Filed: Dec. 23, 1991

Related U.S. Application Data

[63] Continuation of Ser. No. 541,399, Jun. 21, 1990, abandoned.

[30] Foreign Application Priority Data

Jun. 22, 1989 [JP] Japan ................... 1-160107

[51] Int. Cl.⁵ ............................................. B65H 9/16
[52] U.S. Cl. ................................... 271/251; 271/268
[58] Field of Search .................. 271/8.1, 84, 193, 248, 271/278, 306, 250, 251

[56] References Cited

U.S. PATENT DOCUMENTS

| | | | |
|---|---|---|---|
| 2,726,864 | 12/1955 | Waechter | 271/248 |
| 2,729,136 | 1/1956 | Feick et al. | 271/248 |
| 3,415,509 | 12/1968 | Tyburski et al. | 271/248 |
| 3,516,656 | 6/1970 | Sherman | 271/251 |
| 4,334,759 | 6/1982 | Clausing | 271/251 |
| 4,426,073 | 1/1984 | Mizuma | 271/251 |
| 4,432,541 | 2/1984 | Clark et al. | 271/251 |
| 4,955,598 | 9/1990 | Hiroshige et al. | 271/194 |

FOREIGN PATENT DOCUMENTS

| | | | |
|---|---|---|---|
| 1186472 | 2/1965 | Fed. Rep. of Germany | 271/248 |
| 177243 | 6/1984 | Japan | 271/264 |
| 02636 | 1/1986 | Japan | 271/306 |
| 86333 | 5/1986 | Japan | 271/193 |
| 62-285834 | 12/1987 | Japan . | |
| 112351 | 5/1988 | Japan | 271/248 |
| 60532 | 3/1989 | Japan | 271/278 |
| 1-64569 | 3/1989 | Japan . | |
| 1-22846 | 5/1989 | Japan | 271/193 |

Primary Examiner—Robert P. Olszewski
Assistant Examiner—Steven M. Reiss
Attorney, Agent, or Firm—Fitzpatrick, Cella, Harper & Scinto

[57] ABSTRACT

A sheet feeding device includes a vibration member having at least one circular-arc portion, for generating a travelling wave, and a sheet guide for guiding a sheet. Since an amplitude of vibration at an inner circumferential side of the vibration member is smaller than an amplitude of vibration at an outer circumferential side, a distortion is produced in the vibration member in a direction perpendicular to the direction of movement of the sheet. The sheet guide is provided at an inner circumferential side of the vibration member, so that the sheet is fed due to the distortion while being pressed against the sheet guide. Hence, an oblique movement of the sheet due to unevenness in the thickness of the sheet can be prevented.

19 Claims, 3 Drawing Sheets

SHEET FEEDING APPARATUS

This application is a continuation of abandoned application Ser. No. 07/541,399 filed Jun. 21, 1990.

BACKGROUND OF THE INVENTION

1. Field of the Invention

This invention relates to a sheet feeding apparatus provided in machines having a mechanism for feeding a sheet or the like, such as a computer, a copier, a facsimile, a word processor, a typewriter or the like, and more particularly, to a sheet feeding apparatus utilizing travelling vibration waves.

2. Description of the Related Art

Heretofore, this kind of apparatus was configured so as to produce travelling vibration waves in elastic members holding a sheet between them in order to feed the sheet, as disclosed in Japanese Patent Public Disclosure No. 59-177243 (1984).

The principle for feeding the sheet in the above-described disclosure will now been explained by reference to FIG. 3.

In FIG. 3, a sheet 13 is held between elastic members 11 and 12 with an appropriate pressure. A travelling flexural vibration (that is, a travelling vibration wave) is produced in each of the elastic members 11 and 12. Since it is arranged so that the spatial phase difference between the two travelling vibration waves is 180°, the flexural vibrations in the elastic members 11 and 12 travel so that convex portions relative to the sheet 13 of the respective waves always face each other. When a certain material particle, for example, in the convex portion on the surface of each of the elastic members 11 and 12 adjacent the sheet 13 is observed, the material particle performs a movement depicting, in general, an elliptic orbit. As for the elastic member 11, when the travelling vibration wave moves in the rightward direction, the material particle depicts a clockwise elliptic locus $P_1$, as shown in FIG. 3. Accordingly, the direction of movement of the material particle in the convex portion is reverse to the travelling direction of the vibration for both elastic members 11 and 12. Such movements function as forces to feed the sheet 13.

On the other hand, forces to feed the sheet in the same direction as the travelling direction of the wave are produced in concave portions. However, since the pressure by these forces is smaller than that in the convex portions, frictional forces between the sheet 13 and the elastic members 11 and 12 are small, and the forces to feed the sheet are therefore small. As a result, the sum total of the forces to feed the sheet function in a direction reverse to the above-described travelling direction of the flexural vibrations.

In comparison with a sheet feeding method in which a paper feeding roller is rotated by a driving force from, for example, a motor via a transmission means, such as gears and the like, the above-described sheet feeding apparatus has the excellent feature that a highly accurate sheet feeding operation can be realized without any transmission loss due to gears and the like, since the sheet is directly fed by the vibration of the elastic members. However, with such a sheet feeding apparatus, the possibility exists that the sheet is fed in an oblique direction, or moves sideways.

SUMMARY OF THE INVENTION

It is an object of the present invention to provide a sheet feeding apparatus capable of straight feeding a sheet without causing oblique or lateral movement of the sheet.

It is another object of the present invention to provide a sheet feeding apparatus utilizing travelling vibration waves, capable of straight feeding a sheet even if unevenness exists in the thickness of the sheet.

These and other objects and features of the present invention will become more apparent from the following detailed description of the invention.

DESCRIPTION OF THE PREFERRED EMBODIMENTS

Figure 1:
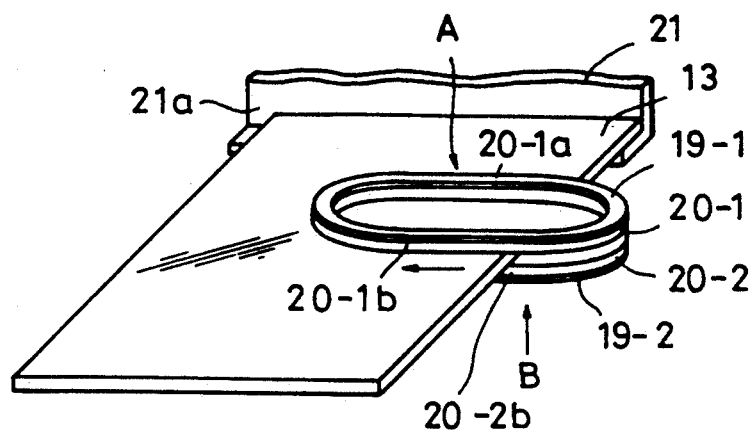
FIG. 1 is a schematic perspective view showing an embodiment of a sheet feeding apparatus according to the present invention.

FIG. 1 is a schematic perspective view showing an embodiment in which a sheet feeding apparatus according to the present invention is applied to printer.

In FIG. 1, a sheet guide 21 fixed to a case of the main body of the printer provides a guide surface 21a, which a side end of a sheet 13 contacts, along the feeding direction of the sheet.

Figure 3:
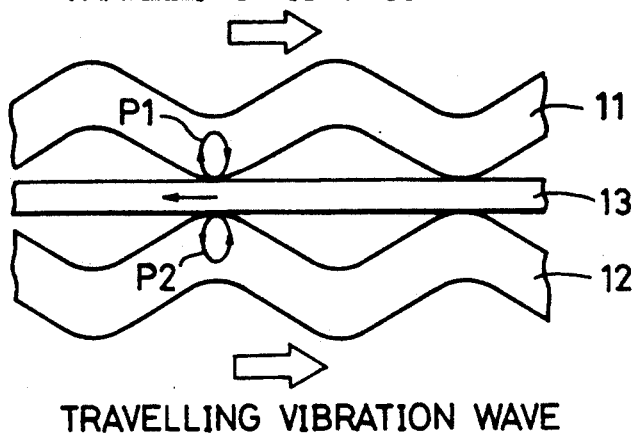
FIG. 3 is a diagram for explaining a principle for feeding a sheet.

An upper vibration member A is made of a vibrator 19-1 consisting of a piezoelectric element, serving as an electromechanical energy conversion member, fixed on the upper surface of an elastic member 20-1, such as a metallic elastic member, formed in the shape of a track having two circular-arc portions. A lower vibration member B is made of a vibrator 19-2 consisting of a piezoelectric element made, for example, of PZT fixed on the lower surface of an elastic member 20-2, which may also be a metallic elastic member, and having the same shape as the elastic member 20-1. The two vibration members A and B are disposed facing with each other in the vertical direction so as to align respective linear portions 20-1a and 20-1b, and 20-2a and 20-2b, which will be described later, in the direction of the feeding direction of the sheet (see the arrow), and hold the sheet between them pressed against it by an energization means (not shown). If AC voltages having a phase difference between them are applied to respective vibrators 19-1 and 19-2 by known voltage supply circuits (not shown), travelling vibration waves as shown in FIG. 3 are produced in respective elastic members 20-1 and 20-2 by a known method, and the sheet 13 is thereby fed in the direction of the arrow.

Figure 2:
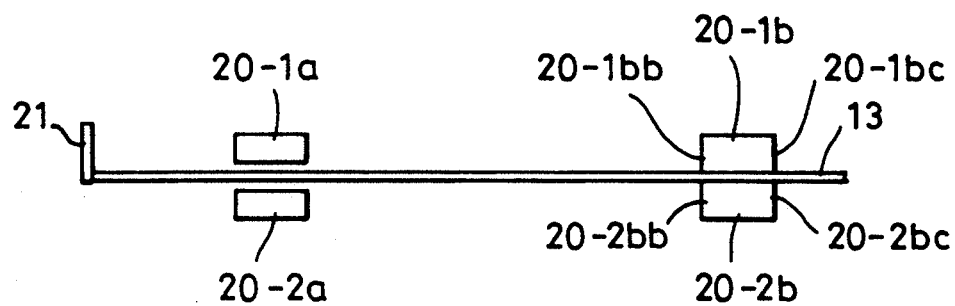
FIG. 2 is a cross-sectional view of the apparatus shown in FIG. 1.

As shown in FIG. 2, the upper and lower elastic members 20-1 and 20-2 are made so that the thickness of linear portions 20-1a and 20-2a at one side of the vibration member is smaller than the thickness of linear portions 20-1b and 20-2b at the other side. Accordingly, the sheet 13 is held and pressed by only the linear portions 20-1b and 20-2b at the other side, and is not influenced by the travelling vibration wave produced at the linear portions 20-1a and 20-2a at the one side, the direction of which is reverse to the direction of the travelling vibration wave produced at the linear portions 20-1b and 20-2b.

In each of the elastic members 20-1 and 20-2 partially having circular-arc portions as shown in FIG. 1, the amplitude of vibration of the travelling vibration wave is different between the inner circumferential sides 20-1bb and 20-2bb and the outer circumferential sides 20-1bc and 20-2bc. Hence, a torsion occurs in a direction perpendicular to the feeding direction of the sheet 13 (see 20-1c in FIG. 4). Consequently, the sheet 13 is fed while being pressed against the sheet guide 21.

As a result, the sheet 13 is fed without moving sideways or in an oblique direction.

Figure 4:
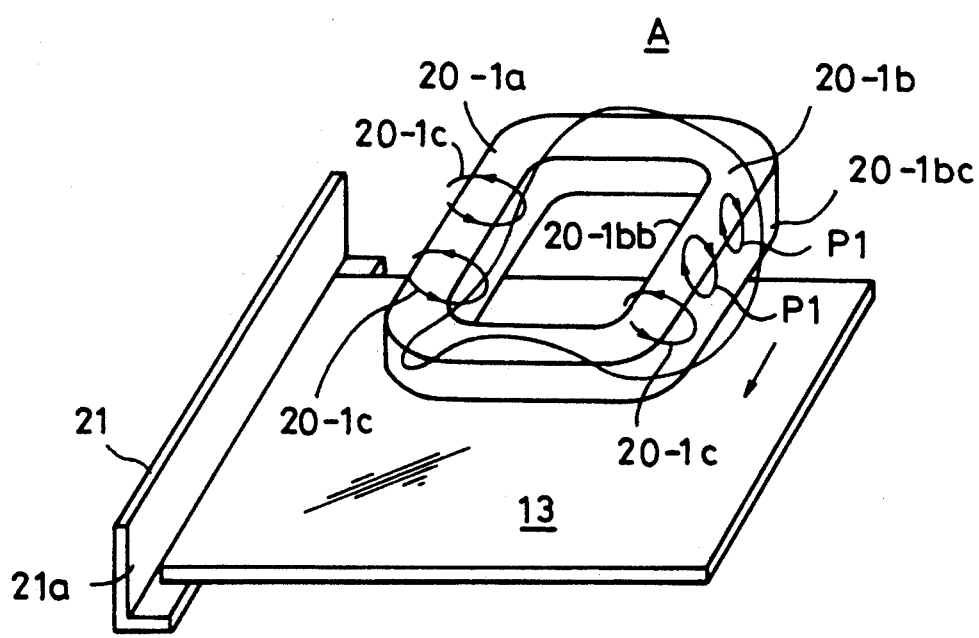
FIG. 4 is a perspective view of an embodiment in which a vibration member has the shape of a rectangular ring.
Figure 5:
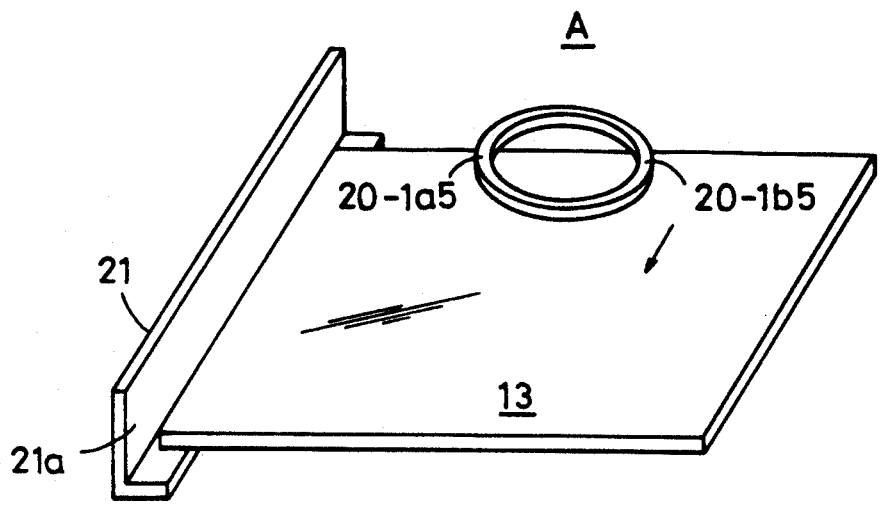
FIG. 5 is a perspective view of an embodiment in which a vibration member has the shape of a perfect circle.

Although, in the above-described embodiment, each of the vibration members A and B has the shape of a track (an ellipse) having two circular-arc portions, it may have the shape of a rectangular ring having four circular-arc portions as shown in FIG. 4, or may have the shape of a perfect circle as shown in FIG. 5. Furthermore, the vibration member may not have the shape of a ring, but may also be a vibration member having, for example, linear portions and one circular-arc portion (not shown). In the FIG. 4 and FIG. 5 embodiments, it is of course necessary, as in the FIG. 1 embodiment, to have the configuration so that only one of the linear portions, 20-1b (FIG. 4), or one of the end portions, 20-1b5 (FIG. 5), is pressed against the sheet 13, and other portions do not contact the sheet 13.

Figure 6:
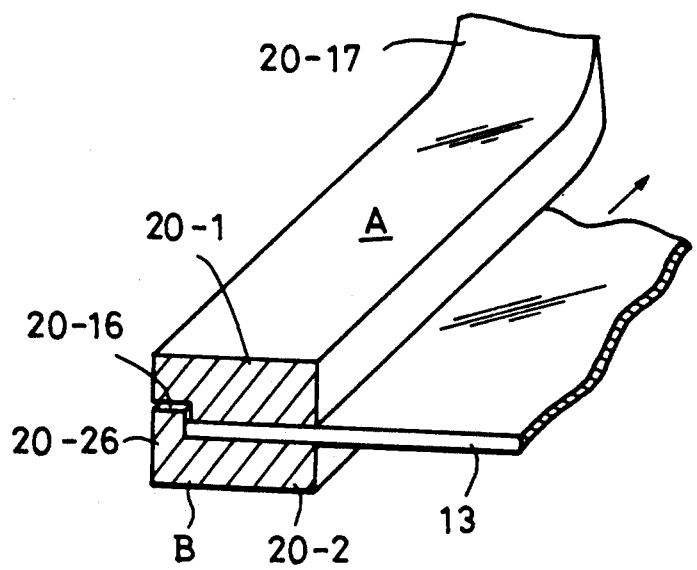
FIG. 6 is a perspective view of a principal part of an embodiment modified from the FIG. 1 embodiment.

FIG. 6 is a perspective view of a principal part of still another embodiment of the sheet feeding apparatus of the present invention applied to a printer. In FIG. 6, vibration members A and B having the shape of a track, identical to that of the vibration members A and B shown in FIG. 1, are provided facing with each other across the sheet 13 and pressed against the sheet 13 as in the FIG. 1 embodiment.

Unlike in the FIG. 1 embodiment however, in the FIG. 6 embodiment, a recess 20-16 is provided at the inner circumferential side of the vibration member A, and a projection 20-26 fitted with the recess 20-16 is also provided at the inner circumferential side of the vibration member B. The projection 20-26 and the recess 20-16 form the sheet guide 21 shown in the FIG. 1 embodiment. The sheet 13 is provided at the outer circumferential side of one of the linear portions of each of the vibration members A and B.

By applying AC signals having a phase difference therebetween to vibrators comprising phase-A and phase-B piezoelectric elements, the travelling vibration waves are produced in the vibration members A and B, as in the FIG. 1 embodiment. Hence, the sheet 13 is fed along the outer circumference of the linear portion of each of the vibration members A and B.

In this embodiment, since the sheet guide is formed by respective parts of the vibration members A and B, it is possible to provide a sheet feeding apparatus with a low cost.

As described above, in the present invention, since a sheet is fed while pressing it against a sheet guide utilizing a distortion due to a difference between amplitudes of vibration produced at the inner cimferential side and the outer circumferential side of each of vibration members having at least one circular-arc portion, oblique movement of the sheet due to unevenness in the thickness of the sheet can be prevented.

Although the two vibration members 20-1 and 20-2 are used in all of the above-described embodiments shown in FIGS. 1, 4, 5 and 6, two vibration members are not always necessary, but only one vibration member may be used. In this case, it is of course desirable to provide an energization means for pressing the vibration member against the sheet.

Furthermore, in the case of the FIG. 6 embodiment, it is necessary to use the vibration member 20-2 having the recess 20-26 as the vibration member.

What is claimed is:

1. An apparatus for feeding a sheet, comprising:
   (a) a vibration member having at least one circular-arc portion, said member having an inner and an outer circumferential portion which contact the sheet;
   (b) an electromechanical energy conversion member, functionally engaging said vibration member for generating a travelling vibration wave in response to an applied electrical signal in said vibration member in which the amplitude of vibration in said inner circumferential portion and the amplitude of vibration in said outer circumferential portion are different, wherein said travelling vibration wave produces a driving force to feed the sheet; and
   (c) a member provided at a predetermined position relative to the side of said inner circumferential portion of said vibration member, for guiding the sheet.

2. An apparatus according to claim 1, wherein said sheet guide member extends along the direction of movement of the sheet, and includes a guiding surface which a side end of the sheet contacts.

3. An apparatus according to claim 1, wherein said sheet guide member includes a guiding surface extending along the direction of movement of the sheet and which a side end of the sheet contacts and a member for supporting the sheet on a predetermined plane.

4. An apparatus according to claim 1, wherein said vibration member includes an annular elastic member.

5. An apparatus according to claim 4, wherein said annular elastic member has the shape of a track.

6. An apparatus according to claim 4, wherein said annular elastic member has the shape of a rectangular ring.

7. An apparatus according to claim 4, wherein said annular elastic member has the shape of a perfect circle.

8. A system having a sheet feeding device, said sheet feeding device comprising:
   (a) a vibration member having at least one circular-arc portion, said member having an inner circumferential portion and an outer circumferential portion which contact the sheet;
   (b) an electromechanical energy conversion member, functionally engaging said vibration member for generating a travelling vibration wave in response to an applied electrical signal in said vibration member in which the amplitude of vibration in said inner circumferential portion and the amplitude of vibration in said outer circumferential portion are different, wherein said travelling vibration wave produces a driving force to feed the sheet; and
   (c) a member provided at the side of said inner circumferential portion of said vibration member for guiding the sheet.

9. A system according to claim 8, wherein said guiding member is fixed to the case of a printer.

10. A sheet feeding apparatus comprising:
(a) a first vibration member having at least one circular-arc portion, said first vibration member having an inner circumferential portion and an outer circumferential portion;
(b) an electromechanical energy conversion member, functionally engaging said vibration member for generating a first travelling vibration wave in response to an applied electrical signal in said first vibration member in which the amplitude of vibration in the inner circumferential portion and the amplitude of vibration in said outer circumferential portion are different;
(c) a second vibration member having at least one circular-arc portion, said second vibration member having an inner circumferential portion provided at a position substantially corresponding to said inner circumferential portion of said first vibration member and an outer circumferential portion provided at a position substantially corresponding to said outer circumferential portion of said first vibration member, and being provided at a position facing said first vibration member and contacting said first vibration member via a sheet;
(d) an electromechanical energy conversion member, functionally engaging said second vibration member for generating a second travelling vibration wave in response to an applied electrical signal in said second vibration member in which the amplitude of vibration in said inner circumferential portion and the amplitude of vibration in said outer circumferential portion are different, wherein said first and second travelling vibration waves together produce a driving force to feed the sheet; and
(e) a member provided at a predetermined position at the side of said inner circumferential portions of said first and second vibration members, for guiding the sheet.

11. A sheet feeding apparatus according to claim 10, wherein said sheet guide member is provided along the direction of movement of the sheet, and includes a guiding surface which a side end of the sheet contacts.

12. A sheet feeding apparatus according to claim 10, wherein said sheet guide member is provided along the direction of movement of the sheet, and includes a guiding surface which a side end of the sheet contacts and a member for supporting the sheet on a predetermined plane.

13. A sheet feeding apparatus according to claim 10, wherein each of said first and second vibration members includes an annular elastic member.

14. A sheet feeding apparatus according to claim 13, wherein said annular elastic member has the shape of a track.

15. A sheet feeding apparatus according to claim 13, wherein said annular elastic member has the shape of a rectangular ring.

16. A sheet feeding apparatus according to claim 13, wherein said annular elastic member has the shape of a perfect circle.

17. A sheet feeding apparatus according to claim 10, wherein said sheet guide member is provided at a position separated from said first and second vibration members.

18. An apparatus for feeding a sheet, comprising:
(a) means having an inner circumferential portion and an outer circumferential portion which contact the sheet for generating a travelling vibration wave in response to an applied electrical signal in which the amplitude of vibration in said inner circumferential portion and the amplitude of vibration in said outer circumferential portion are different, said travelling vibration wave creating a driving force for producing relative movement between the sheet and said travelling vibration wave generating means; and
(b) a member provided at a predetermined position relative to the side of said inner circumferential portion of said travelling vibration wave generating means, for guiding the sheet.

19. An apparatus for feeding a sheet, comprising:
(a) an annular elastic vibration member having an upper surface, a lower surface, an inner circumferential portion, and an outer circumferential portion;
(b) an electromechanical energy conversion element, provided on said lower surface of said vibration member for generating a travelling vibration wave in response to an applied electrical signal in said vibration member in which the amplitude of vibration in said inner circumferential portion and the amplitude of vibration in said outer circumferential portion are different, wherein said travelling vibration wave creates a driving force for producing relative movement between the sheet in contact with the upper surface of said vibration member and said vibration member; and
(c) a member provided at a predetermined position relative to the side of said inner circumferential portion of said vibration member, for guiding the sheet.

* * * * *

UNITED STATES PATENT AND TRADEMARK OFFICE
CERTIFICATE OF CORRECTION

PATENT NO. : 5,244,202

DATED : September 14, 1993

INVENTOR(S) : Yoshifumi NISHIMOTO, et al.

It is certified that error appears in the above-indentified patent and that said Letters Patent is hereby corrected as shown below:

On the Cover Page
   [56] FOREIGN PATENT DOCUMENTS, "1-22846 5/1989 Japan" should read --1-122846 5/1989 Japan--.

Signed and Sealed this

Twelfth Day of April, 1994

Attest:

BRUCE LEHMAN

Attesting Officer     Commissioner of Patents and Trademarks